United States Patent
Ezell et al.

(10) Patent No.: US 6,674,853 B1
(45) Date of Patent: Jan. 6, 2004

(54) INTEGRATION OF REMOTE ACCESS AND SERVICE

(75) Inventors: Joel Ezell, Broomfield, CO (US); John S. Helton, Ascot (GB); Norman W. Petty, Boulder, CO (US); Douglas A. Spencer, Boulder, CO (US); Wayne A. Zakowski, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 531 days.

(21) Appl. No.: 09/718,909

(22) Filed: Nov. 22, 2000

(51) Int. Cl.[7] .......................... H04M 3/00; H04M 5/00; H04M 3/42; H04L 12/28; H04L 12/56
(52) U.S. Cl. .................. 379/242; 379/211.02; 370/401
(58) Field of Search ................................. 379/242, 219, 379/220.01, 229, 230, 211.02, 100.01, 93.01; 370/401, 409, 355; 709/206

(56) References Cited

U.S. PATENT DOCUMENTS

| | | | | |
|---|---|---|---|---|
| 5,159,594 A | * | 10/1992 | Bales et al. | 370/409 |
| 5,416,834 A | * | 5/1995 | Bales et al. | 379/211.02 |
| 5,764,639 A | * | 6/1998 | Staples et al. | 370/401 |
| 5,867,568 A | * | 2/1999 | Ackerman et al. | 379/211.02 |
| 6,023,470 A | * | 2/2000 | Lee et al. | 370/401 |
| 6,028,917 A | * | 2/2000 | Creamer et al. | 379/100.01 |
| 6,084,892 A | * | 7/2000 | Benash et al. | 370/401 |
| 6,115,460 A | * | 9/2000 | Crowe et al. | 379/211.02 |
| 6,301,339 B1 | * | 10/2001 | Staples et al. | 379/93.01 |
| 6,377,571 B1 | * | 4/2002 | Tai | 370/355 |
| 6,438,585 B2 | * | 8/2002 | Mousseau et al. | 709/206 |

* cited by examiner

Primary Examiner—Benny Tieu
(74) Attorney, Agent, or Firm—John C. Moran (57) ABSTRACT allowing a central business communication system to handle all aspects of call setup on a remote switch. Call control for a telecommunication call set up on a remote switch continues to be handled by the central business communication system; however, the switching of the bearer channels is performed automatically on the remote switch if the telecommunication call is between telecommunication terminals on the remote switch. In addition, if the telecommunication call is between two remote switches, the remote switches will automatically communicate the bearer channels through an interconnecting media without going through the central business communication system. In addition, when an Internet protocol (IP) such as IETF RFC 791 is utilized to communicate the bearer channels between the central business communication system and the remote switch, multi-frequency dialing tones received from analog telephones connected to the remote switching network are converted to digital information before transmission via the IP communication channels to the central business telecommunication system.

12 Claims, 6 Drawing Sheets

TABLE 1

| TCP PORT | RTP PORT | ENDPOINT ID |
|---|---|---|
|  |  |  |
|  |  |  |
|  | ⋮ |  |
|  |  |  |

INTEGRATION OF REMOTE ACCESS AND SERVICE

TECHNICAL FIELD

The present invention relates to telecommunication switching systems and, in particular, to access and services provided at remote sites to a telecommunication switching system.

BACKGROUND OF THE INVENTION

In the prior art, it has long been recognized that there often exists a need for supplying a small switching network at a remote site to provide telecommunication switching functions for a group of users at that location. It is also well known that it is desirable that this small switching network be controlled by a central business telecommunication switching system so that the users at the remote site are provided the same features and functions as the users co-located with the central business communication system. In general, there is a need for multiple remote networks. The system disclosed in U.S. Pat. No. 5,159,594 provides remote networks serving a plurality of telecommunication terminals and telecommunication trunks controlled by a central business telecommunication system. In this patent, control is established from the central business communication system to each remote network via ISDN channels that may be switched through intervening switching nodes without disturbing the control channels that have been established. The system disclosed in U.S. Pat. No. 5,159,594 does suffer from the disadvantage that all bearer channels switching must be performed by a central switching network on the central business communication system for the establishments of telephone calls. The result is that considerable bandwidth must be utilized to transport the bearer channels back to the central switching system from the remote switching network for switching purposes. The switching must be performed by the central switching network even if the telephone call has been established between two telecommunication terminals that are each connected to the remote switching network.

U.S. Pat. No. 5,764,639 does disclose a system which allows a central business communication system to have limited control over telephones at a remote location where the telephones are interconnected to a key system unit. The remote telephones via the key system unit can call each other directly or obtain a local trunk to a central office via the key system unit. However, the users at the remote site are required to dial different sequences of digits to call a local telephone or gain access to the local trunk verses the digit sequences used when the user is calling telephone or gaining access to a trunk connected directly to the central business communication system. U.S. Pat. No. 5,764,639 does disclose that the interconnection between the remote user and the central business communication system could be via the public telecommunication switching network using analog or ISDN trunking.

SUMMARY OF THE INVENTION

The aforementioned problems are solved and a technical advance is achieved in the art by an apparatus and method that allow a central business communication system to handle all aspects of call setup on a remote switch. Advantageously, call control for a telecommunication call set up on a remote switch continues to be handled by the central business communication system; however, the switching of the bearer channels is performed automatically on the remote switch if the telecommunication call is between telecommunication terminals on the remote switch. In addition, if the telecommunication call is between two remote switches, the remote switches will automatically communicate the bearer channels through an interconnecting media without going through the central business communication system.

In addition, when an Internet protocol (IP) such as IETF RFC 791 is utilized to communicate the bearer channels between the central business communication system and the remote switch, multi-frequency dialing tones received from analog telephones connected to the remote switching network are converted to digital information before transmission via the IP communication channels to the central business telecommunication system.

Other and further aspects of the present invention will become apparent during the course of the following description and by reference to the accompanying drawing.

DETAILED DESCRIPTION

Figure 1:
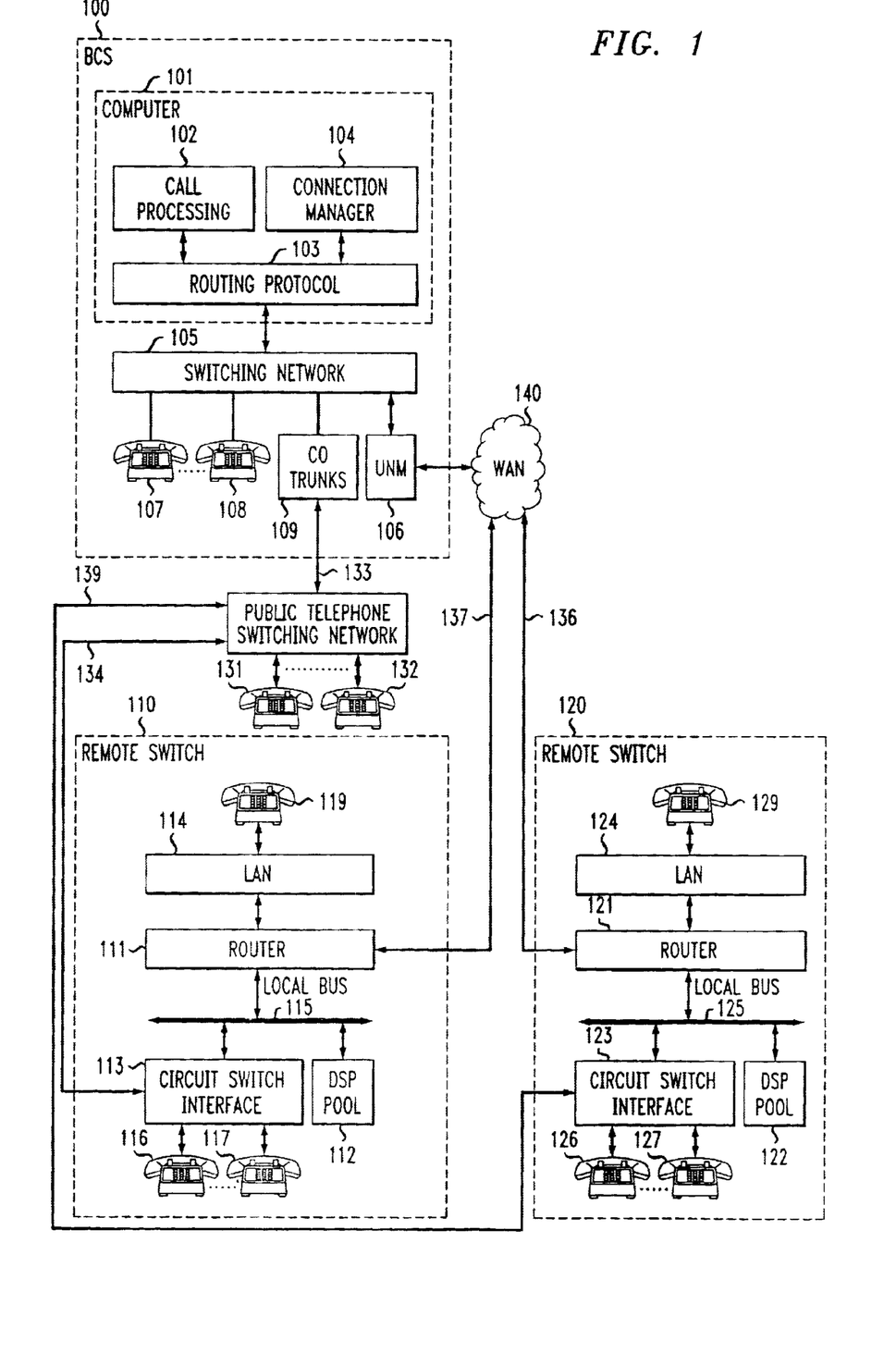
FIG. 1 illustrates, in block diagram form, a system for implementing the invention.

FIG. 1 illustrates a system for implementing the invention. Central business communication system (BCS) 100 provides control for all telecommunication terminals and trunks interconnected to switching network 105 and to remote switches 110 and 120. BCS 100 is interconnected to remote switch 110 and remote switch 120 via wide area network (WAN) 140. BCS 100 interconnects to WAN 140 via link 138. Similarly, remote switches 110 and 120 are interconnected to WAN 140 via links 137 and 136, respectively. WAN 140 can be comprised of a variety of communication media including but not limited to the Internet or an Intranet of a corporation. BCS 100, remote switch 110, and remote switch 120 are interconnected to the public switching telephone network via trunks 133, 134, and 139, respectively. Public switching telephone network 130 also provides direct service for telephones 131 through 132.

BCS 100 comprises computer 101, switching network 105, CO trunks 109, telephones 107–108 and universal network module (UNM). Computer 101 provides overall control of BCS 100 by the execution of software modules 102–104. Advantageously, BCS 100 may be the Definity Business Communication System manufactured by Avaya Inc. Switching network 105 and CO trunks 109 perform operations well known to those skilled in the art. UNM 106 provides the interface between BCS 100 and WAN 140. UNM 106 performs the necessary conversion of both control and bearer information being transported on the IP protocol via WAN 140 to the protocol necessary so that this information can be communicated through switching network 105 either as control information to computer 101 or to telecommunication terminals such as telecommunication terminal 107 or trunks 109. UNM 106 properly converts the protocol for control messages either being received or transmitted to computer 101 via switching network 105. In addition, with respect to audio information being received from WAN 140 or being transmitted to it, it is necessary to do a conversion in the manner in which this information is encoded. Further details concerning the internal operations of UNM 106 are set forth in FIG. 7.

Remote switch 110 consists of elements 111–119 and remote switch 120 consists of elements 121–129. With respect to remote switch 110, router 111 is responsible for communicating both control and bearer information with WAN 140 to or from DSP pool 112, circuit switch interface 113, and LAN 114 via local bus 115. In addition, router 111 provides overall control of elements 112–114 with respect to computer 101.

DSP pool 112 provides a plurality of DSP devices that are utilized for bearer channel conversion activities as well as performing other functions such as tone detection. Circuit switch interface 113 provides a mechanism for providing service for classical telecommunication terminals and trunks that are used by users at remote switch 110. Circuit switch interface 113 together with router 111 allows computer 101 to control the classical telecommunication terminals attached to circuit switch interface 113. These telecommunication terminals can be analog or digital telephones and a variety of central office trunks including analog or digital trunks. LAN 114 provides a local area network at the site of remote switch 110 which can be utilized by data terminals and IP telephones such as IP telephone 119. Router 111 interconnects LAN 114 to WAN 140 and allows computer 101 to control the operation of IP telephones connected to LAN 114.

Figure 3:
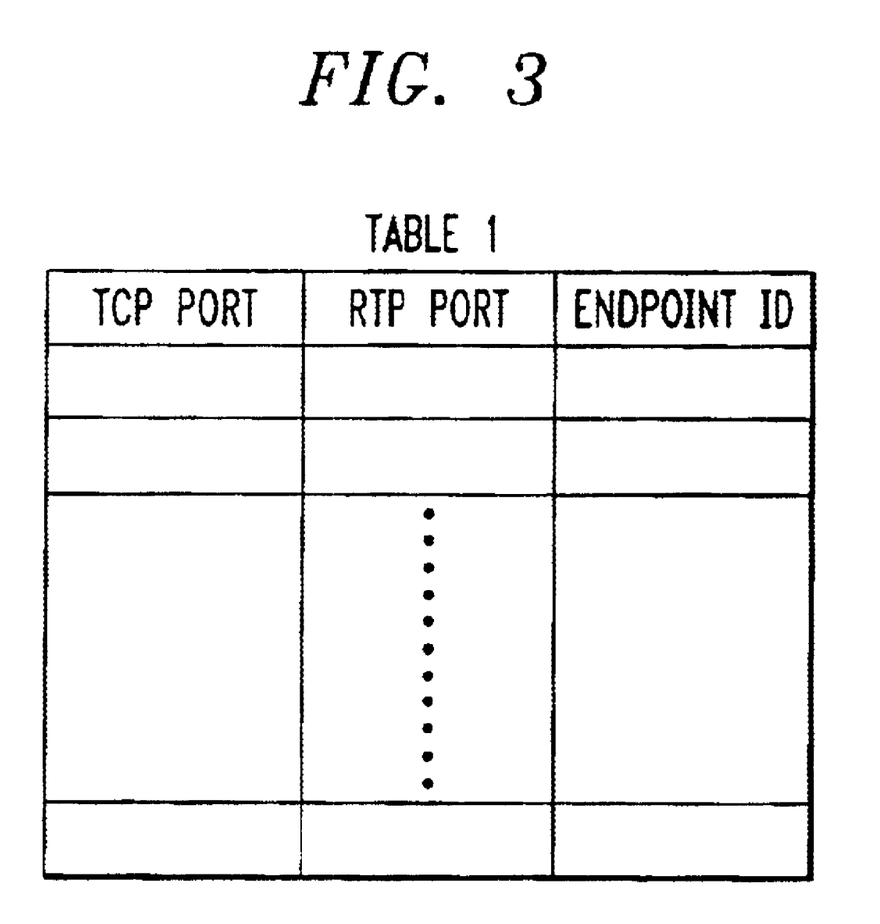
FIG. 3 illustrates, in table form, information utilized by a system for implementing the invention.

To better understand the overall operation of the system illustrated in FIG. 1, consider the following three examples. The first example illustrates a telephone call being set up through the system of FIG. 1 in a conventional manner. On the other hand, the second and third examples illustrate a telephone call being set up through the system of FIG. 1 in accordance with the invention and illustrate the advantages in costs of the invention over conventional techniques. In all three examples, upon initialization, circuit switch interface 113 identifies each telecommunication terminal, i.e., terminal 116 to router 111. Router 111 maintains internal Table 1 as illustrated in FIG. 3 that is explained later in greater detail for the telecommunication terminals. Router 111 then identifies each of the terminals to computer 101. Computer 101 considers each of these terminals as an integral part of BCS 100 and establishes the proper identification within an internal table.

In the first example, telecommunication terminal 116 of remote switch 110 places a call to telecommunication terminal 107 of BCS 100. After this call is set up, the bearer channel continues to be maintained between telecommunication terminals 116 and 107 via switching network 105, UNM 106, WAN 140, router 111, and circuit switch interface 113. When telecommunication terminal 116 originates the call to telecommunication terminal 107, circuit switch interface 113 communicates the call origination to router 111 which in turn transmits this to computer 101 of BCS 100. Computer 101 controls switching network 105 so as to provide dial tone to telecommunication terminal 116. As telecommunication terminal 116 proceeds to dial digits utilizing multi-frequency tones, router 111 utilizes a DSP from DSP pool 112 to detect these digits, is responsive to the detected digits to encode these digits and transmit them as digital control messages to computer 101. Computer 101 then utilizing call processing module 102 determines that the call is being placed to telecommunication terminal 107 and transmits messages to switching network 105 to alert telecommunication terminal 107. When telecommunication terminal 107 responds to the alerting and answers the incoming call, computer 101 completes a bearer channel through switching network 105, UNM 106, WAN 140, router 111 and circuit interface 113. This bearer channel remains established for the duration of the call.

In the second example, when telecommunication terminal 116 originates a call to telecommunication terminal 117 which are both connected to circuit switch interface 113, circuit switch interface 113 communicates the call origination to router 111 which in turn transmits this call origination to BCS 100. Computer 101 controls switching network 105 so as to provide dial tone to telecommunication terminal 116. As telecommunication terminal 116 proceeds to dial digits utilizing multi-frequency tones, router 111 utilizes a DSP from DSP pool 112 to detect these digits, is responsive to the detected digits to encode these digits and transmit them as digital control messages to computer 101. Note, if telecommunication terminal is a digital telephone, it would directly generate its dialing information as digit control messages. Computer 101 then utilizing call processing module 102 determines that the call is being placed to telecommunication terminal 117 and request that alerting be provided to telecommunication terminal 117.

When telecommunication terminal 117 responds to the alerting and answers the incoming call, this fact is communicated to computer 101. Computer 101 than utilizes a technique that is referred to here as shuffling. In shuffling, computer 101 directs two IP terminals to establish an IP bearer channel through WAN 140 and to directly communicate audio information via this IP bearer channel. Any bearer channels that had been established to switching network 105 from the terminals will be removed. To accomplish shuffling, connection manager software module 104 is responsive to the IP addresses stored internally to transmit a shuffling message to both telecommunication terminals 116 and 117 utilizing the IP address for both messages as that of router 111. Router 111 is responsive to the shuffling messages to determine that both telecommunication terminals are connected to circuit switch interface 113. Router 111 then instructs circuit switch interface 113 to interconnect telecommunication terminals 116 and 117 utilizing the internal circuit switch network of circuit switch interface 113.

In the third example, telecommunication terminal 116 originates a call to telecommunication terminal 127 that is connected to circuit switch interface 123. Circuit switch interface 113 communicates the call origination from telecommunication terminal 116 to router 111 which in turn transmits this call origination to BCS 100. Computer 101 controls switching network 105 so as to provide dial tone to telecommunication terminal 116. As telecommunication terminal 116 proceeds to dial digits utilizing multi-frequency tones, router 111 utilizes a DSP from DSP pool 112 to detect these digits, is responsive to the detected digits to encode these digits and transmit them as digital control messages to computer 101. Computer 101 then utilizing call processing module 102 determines that the call is being placed to telecommunication terminal 127 and request that alerting be provided to telecommunication terminal 127 via router 121 and circuit switch interface 123.

When telecommunication terminal 127 responds to the alerting and answers the incoming call, this fact is communicated to computer 101. Computer 101 than utilizes the shuffling technique. Any bearer channels that had been established to switching network 105 from the terminals will be removed. To accomplish shuffling, connection manager software module 104 is again responsive to the IP addresses stored internally to transmit a shuffling message to both telecommunication terminals 116 and 127 utilizing the IP address for router 111 and router 121, respectively. Routers 111 and 121 are responsive to the shuffling messages to interconnect telecommunication terminals 116 and 117 utilizing the internal circuit switch networks of circuit switch interfaces 113 and 123 and WAN 140.

Figure 2:
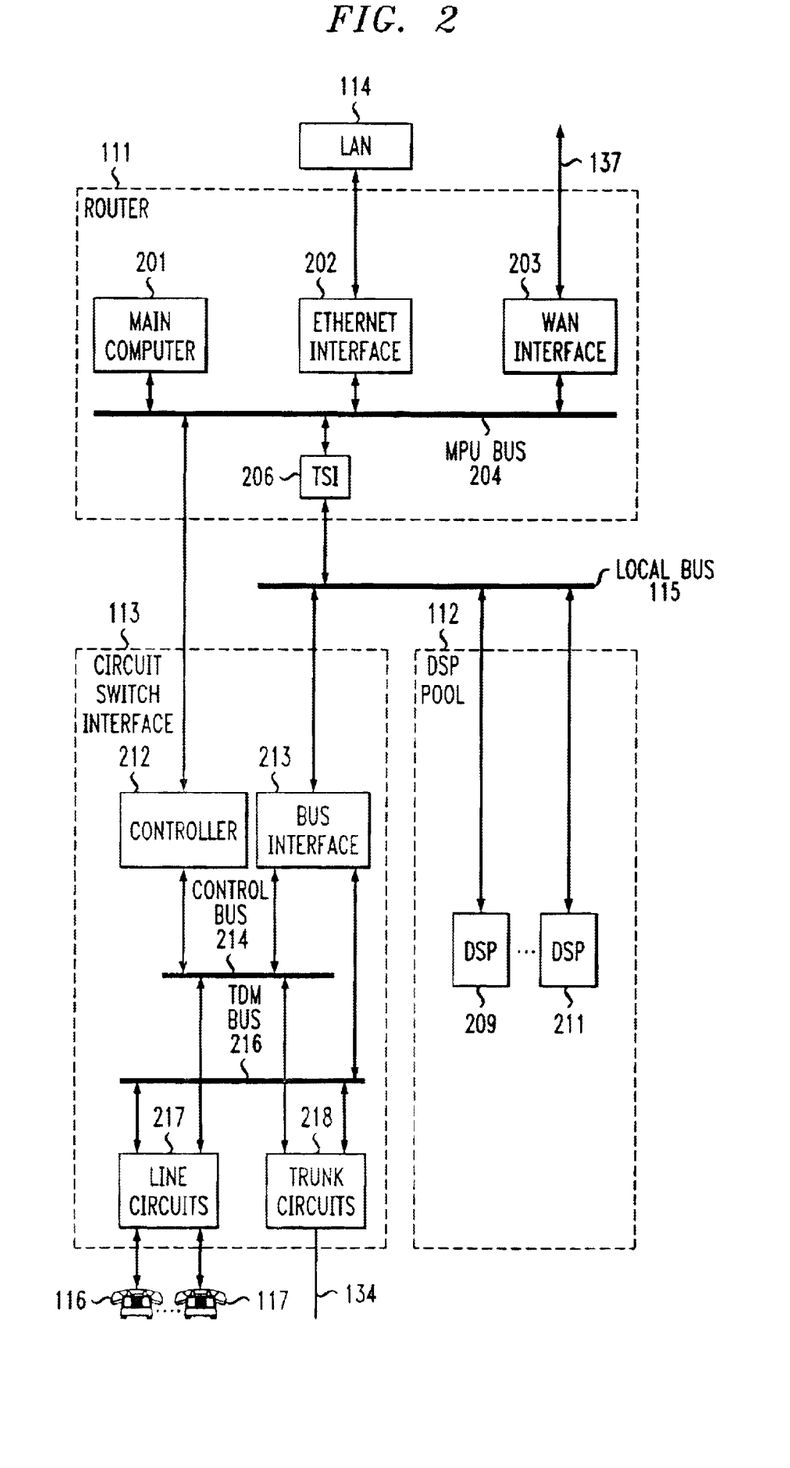
FIG. 2 illustrates, in block diagram form, a remote switch.

FIG. 2 illustrates in greater detail remote switch 110. DSP pool 112 consists of DSPs 209–211 which are controlled by main CPU 201 via MPU bus 204. Router 111 comprises main CPU 201 that provides overall control of remote switch 110. Time slot interchange (TSI) 206 provides a mechanism for interexchanging time slots on local bus 115 and MPU bus 204. In addition, TSI 206 can be utilized to interexchange time slots that are being received from telecommunication terminals 116, 117 and trunk circuits 218. This provides remote switch 110 with the capability of performing local circuit switching. Ethernet interface 202 interfaces local LAN 114 to bus 204. In addition, WAN interface 203 interconnects bus 204 to WAN 140. Bus 204 is the overall informational highway that is used to communicate both control and bearer information within router 111.

DSP pool 112 comprises DSPs 209–211 that are under control of main CPU 201 to perform the necessary coding and conversion tasks.

Circuit switch interface 113 comprises elements 212–218. Controller 212 provides overall control of circuit switch interface 113. Bus interface 213 interfaces control bus 214 and TDM bus 216 with local bus 115. Control bus 214 is utilized to communicate control information between line circuits 217 and trunk circuits 218 and controller 212. TDM bus 216 is utilized to communicate digitally encoded speech or data samples with lines circuits 217 and trunk circuits 218. Line circuits 217 are utilized to provide termination for telecommunication terminals; whereas, trunk circuits 218 terminate trunks with the public telephone switching network 130.

Figure 4:
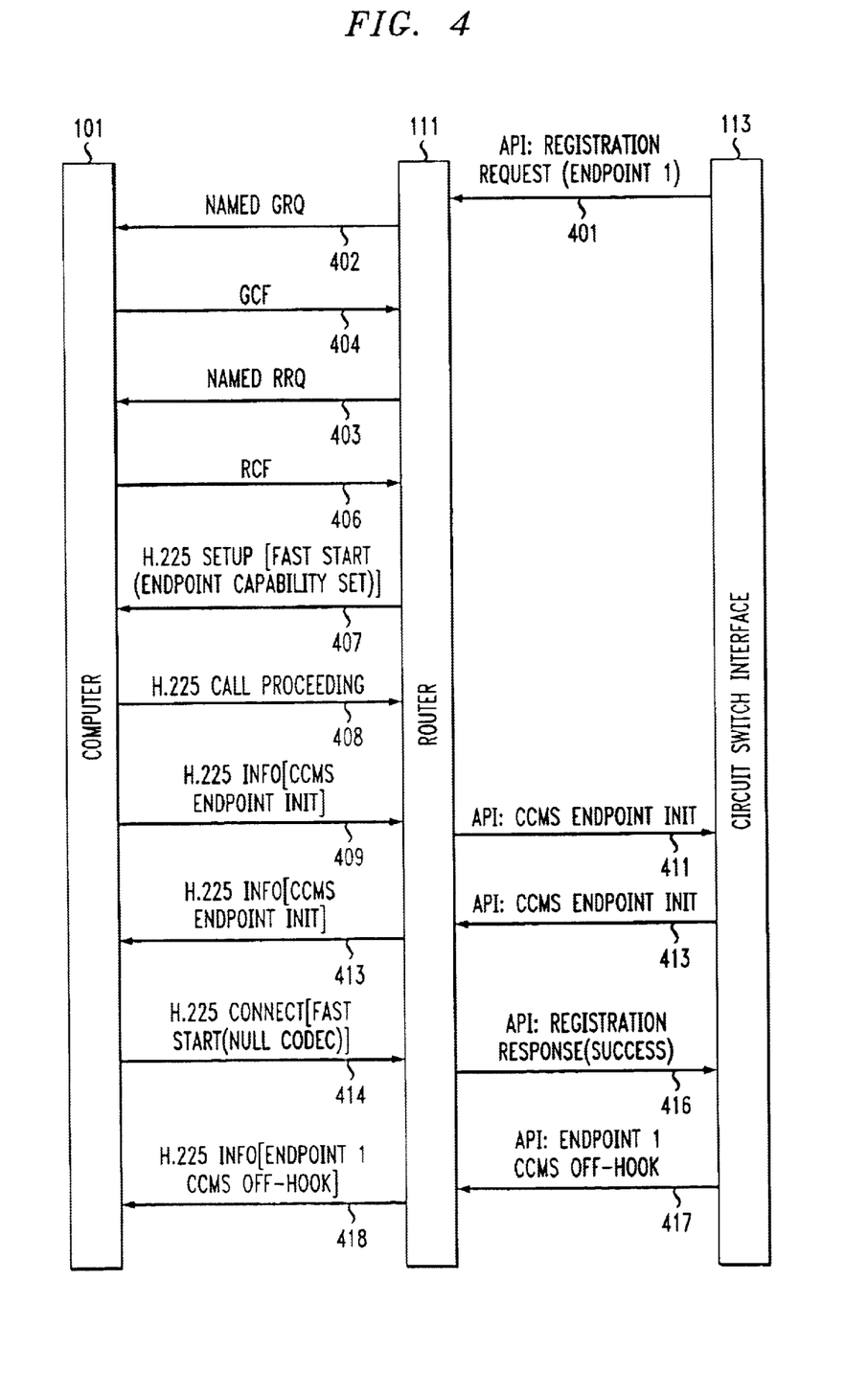
FIGS. 4–6 illustrate the communications of control information for establishing a call between two telecommunication terminals connected on a remote switch.
Figure 5:
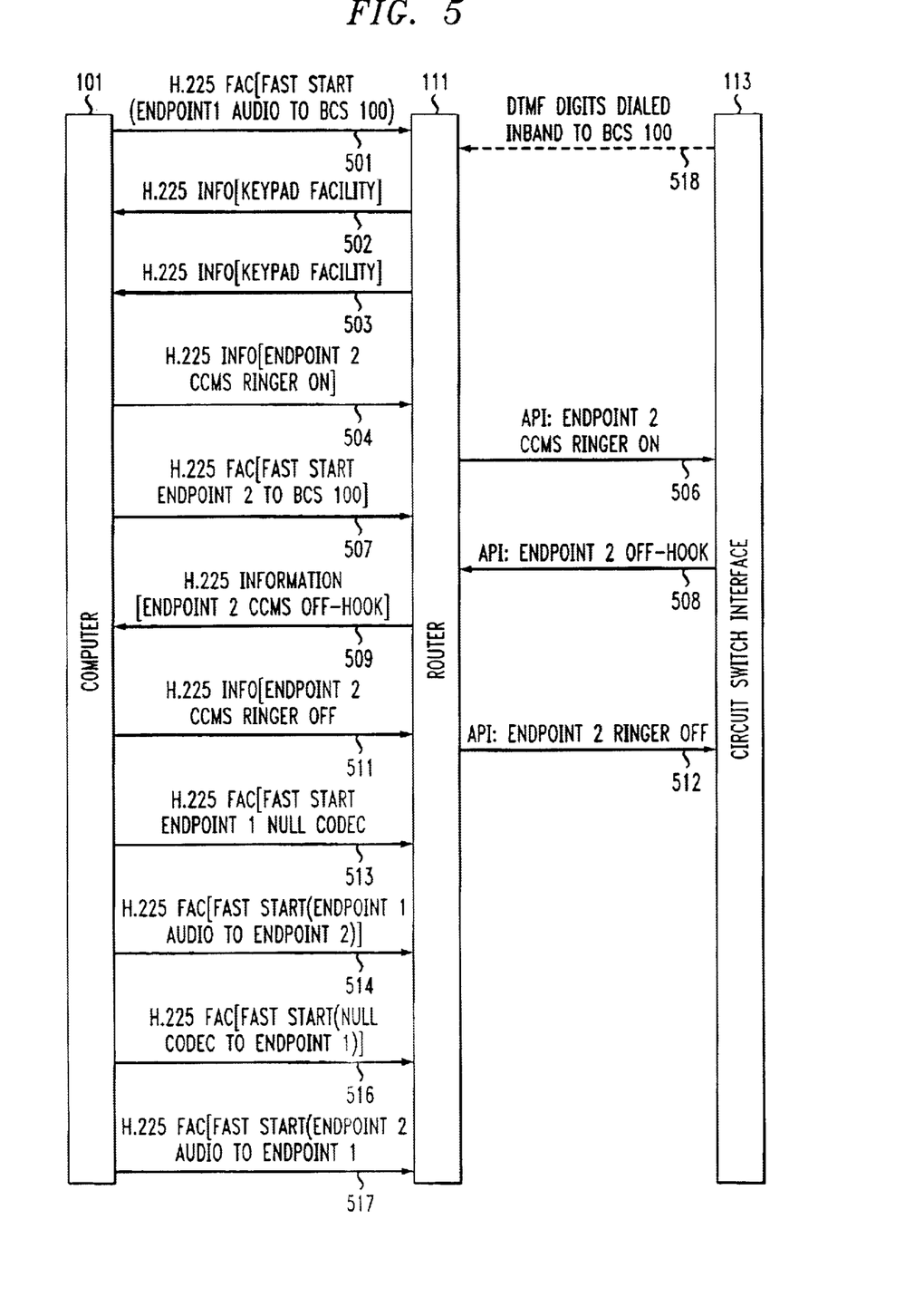
Figure 6:
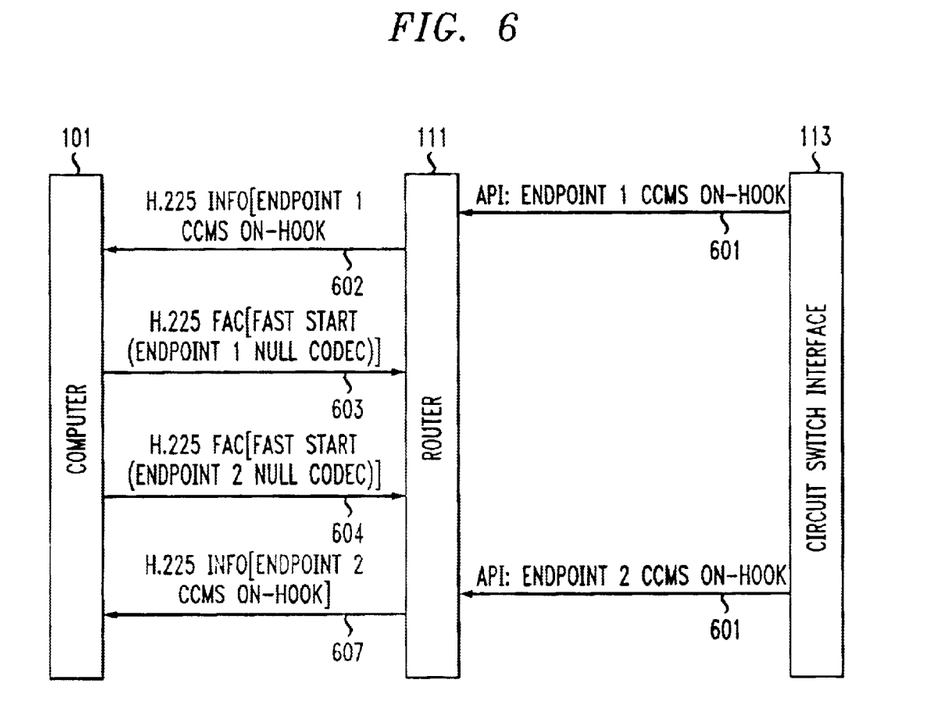

To better understand the operation of the system illustrated in FIG. 1, consider in greater detail the second example of the telephone call that is being set up between telecommunication terminal 116 and telecommunication terminal 117. Telecommunication terminals 116 and 117 are classical telecommunication terminals such as analog telephones or proprietary digital telephones. One skilled in the art could readily envision that BRI telephone sets could also be utilized. FIGS. 4–6 illustrate the flow of messages between computer 101 of BCS 100, router 111 of remote switch 110, and circuit switch interface 113 of remote switch 110. Messages 401–416 of FIG. 4 illustrate the messages that are transmitted for each trunk and line circuit at initialization that is terminating terminals or trunks on circuit switch interface 113. Router 111 maintains Table 1 of FIG. 3 in which entries are made for each of the telecommunication terminals connected to circuit switch interface 113. When a telecommunication terminal becomes active, it transmits a registration request to router 111 identifying the endpoint ID number of the telecommunication terminal that has become active. Computer 101 and router 111 then exchange messages 402 through 406 to register router 111 on computer 101. In response to message 401, router 111 enters into Table 1, FIG. 3, the endpoint identifier of the telecommunication terminal requesting registration and determines a TCP and RTP port numbers. To establish a logical channel for the telecommunication terminal, router transmits to computer 101 a H.225 Setup [Fast Start (endpoint capability set)] message which is message 407. The format of the H.225 message means a Setup message with a Fast Start element with the endpoint capability set. In message 407, router 111 also sends the TCP port number and a RTP port number to computer 111. Computer 101 responds with an H.225 call proceeding message in message 408 and a H.225 INFO message (CCMS endpoint initialization) in message 409. CCMS means a control channel message setup. When a CCMS message is transmitted from circuit switch interface 113, it is stimulus message such as an off hook indication. When a CCMS message (as part of a H.225 INFO message) is transmitted by computer 101, it is a control message such as turn the ringer in the terminal on. In response to message 409, a series of messages are exchanged between router 111 and circuit switch interface 113 which are denoted as messages 411 and 412 in FIG. 4. Router 111 transmits messages 411 to circuit switch interface 113 which are APIs messages initializing the CCMS endpoint initialization. Circuit switch interface 113 is responsive to messages 111 to confirm these initializations to router 111 in messages 412. Router 111 communicates the CCMS endpoint initialization to computer 101 in message 413. Since it is not desirable to maintain any bearer capability with the channel that had been established in messages 407 through 413 but rather only to maintain a control channel, computer 101 transmits to router 111 a H.225 Connect [Fast Start (no CODEC)] message 414 to router 111. In response to message 414, router 111 closes the bearer capability on the channel and transmits message 416 to circuit switch interface 113 informing it that the registration has been successful. Note, that in transmitting CCMS information to computer 101 from router 111, this information is placed in an INFO element of the H.225.

After transmission of message 416, the telecommunication terminal connected to circuit switch interface 113, the telecommunication terminal is in the idle state but fully registered with computer 101. Call processing module 102 of computer 101 views the telecommunication terminal as a digital telephone that is directly connected to BCS 100. For all of the telecommunication terminals connected to circuit switch interface 113, the sequence of messages 407416 is performed.

When telecommunication terminal 116 originates a call, telecommunication terminal 116 transmits message 417 to router 111. Note, that in this example telecommunication terminal 116 has endpoint number 1 and telecommunication terminal 117 has endpoint number 2. At this point in the message flow diagrams, telecommunication terminal 117 has also been registered on computer 101. In response to message 117, router 111 transmits the CCMS off-hook signal to computer 101 utilizing an H.225 INFO message 418. This message identifies telecommunication terminal 116 by its TCP port number. In response to message 418, dial tone will be provided to telecommunication terminal 116 by a tone generator in switching network 105 of BCS 100. Consequently, it is necessary to establish a bearer channel interconnecting the tone generator with telecommunication terminal 116. This is accomplished by computer 101 transmitting message 501 of FIG. 5 which is an H.225 FAC message to router 111. Message 501 includes the RTP number that has been chosen by computer 101 to refer to this bearer channel. In addition, message 501 defines the audio encoding protocol that will be utilized on this bearer channel. That information is utilized by router 111 to properly initiate a DSP from DSP pool 112 that will be used to encode the audio information being communicated with BCS 100. The DSP assigned to the bearer channel converts the audio information being received over the IP channel to digitally encoded information that can be utilized by the line circuit controlling telecommunication terminal 116. With respect to FIG. 2, this information is communicated from the assigned DSP in DSP pool 112 to the line circuit via MPU bus 204, TSI 206, local bus 115, bus interface 213, and TDM bus 216.

As telecommunication terminal 116 starts to dial DTMF tones (signals 518), these tones are routed to the assigned DSP in DSP pool 112. Rather than converting this audio information into the proper audio code for transmission via WAN 140 to BCS 100, the assigned DSP detects each DTMF digit and transmits this DTMF digit to main CPU 201 via control bus 214, controller 212 and MPU bus 204. Main CPU 201 then transmits each of these converted DTMF digits to computer 101 as illustrated by messages 502 and 503.

Computer 101 is responsive to the dialed telephone number of telecommunication terminal 117 to transmit message 504 that is a H.225 INFO (endpoint 2 CCMS ringer-on) message. In response to message 504, router 111 transmits message 506 to circuit switch interface 113 instructing that ringing be applied to telecommunication terminal 117. Router 111 identifies the telecommunication terminal for which message 501 is intended by the RTP number that computer 101 includes in message 501. Similarly, in message 504 this same type of identification is done but for telecommunication terminal 117. Note, that also in message 501 the IP address is that for router 111. There is only one IP address for router 111; hence, for all of the telecommunication terminals and trunks attached to circuit switch interface 113. After transmitting message 504, computer 101 transmits message 507 that is an H.225 FAC [Fast Start endpoint] message that establishes a bearer channel to switching network 105 from telecommunication terminal 117. Note, that this is not actually used if it is possible to perform shuffling between the telecommunication endpoints.

When the user of telecommunication terminal 117 answers, an endpoint 2 off-hook message (message 508) is transmitted from circuit switch interface 113 to router 111. In response, router 111 transmits to computer 101 message 509 that is an H.225 INFO (endpoint 2 CCMS off-hook) message. In response, computer 101 transmits message 511 that is an H.225 INFO (endpoint 2 CCMS ringer-off) message to router 111 to turn off the ringing to telecommunication terminal 117. In response to message 511, router 111 transmits message 512 that instructs circuit switch interface 113 to turn off the ringing for telecommunication terminal 117.

By looking at administration tables, computer 101 realizes that endpoint 1 and endpoint 2 are IP endpoints that can be shuffled which means that these endpoints can directly transmit to each other without having to go through switching network 105. Computer 101 transmits messages 513 and 516 to remove these two IP bearer channels to switching network 105 from remote switch 110. Messages 513 and 516 are H.225 FAC Fast Start messages to null the CODEC's. To actually interconnect the two IP endpoints, computer 101 transmits message 514 that is an H.225 FAC [Fast Start (endpoint 1 audio to endpoint 2)] message. The IP address to which message 514 and a similar message 517 are set is the IP address of router 111. Router 111 utilizes the RTP number contained in the messages to determine that these messages are actually endpoints connected to circuit switch interface 113 by examining Table 1 of FIG. 3. Hence, in response to messages 514 and 517, router 111 establishes a digital channel between the lines circuits controlling telecommunication terminals 116 and 117 via TDM bus 216, bus interface 213, local bus 115, and TSI 206 of FIG. 2. Advantageously, this means that the audio information to and from telecommunication terminals 116 and 117 does not have to be converted into an IP format transmitted back to switching network 105 of BCS 100, switched by switching network 105, received back from switching network 105, and decoded from the IP format. Further, the software applications of computer 101 are unaware of the physical locations of these telecommunication terminals in fact this procedure works equally well if the telecommunication terminals are each on a different remote switch.

The messages illustrated in FIG. 6 illustrate how the established call is removed. Telecommunication terminal 116 goes on-hook, and circuit switch interface 113 transmits an endpoint 1 CCMS on-hook message 601 to router 111. In response, router 111 encodes the message into an INFO message and transmits this message as message 602 that is an H.225 INFO (endpoint 1 CCMS o-hook) message to computer 101. In response, computer 101 transmits messages 603 and 604 that are H.225 FAC [Fast Start (endpoint null CODEC)] messages. These two messages cause the telecommunication terminals to close their bearer channels which in this case results in the connection that had been established between the telecommunication terminals by TDM bus 216, bus interface 213, local bus 115, and TSI 206 to be removed by controller 212 of circuit switch interface 113. Finally, telecommunication terminal 117 goes on-hook which results in messages 606 and 607 being transmitted to informed computer 101 that telecommunication terminal 117 is now on-hook.

Figure 7:
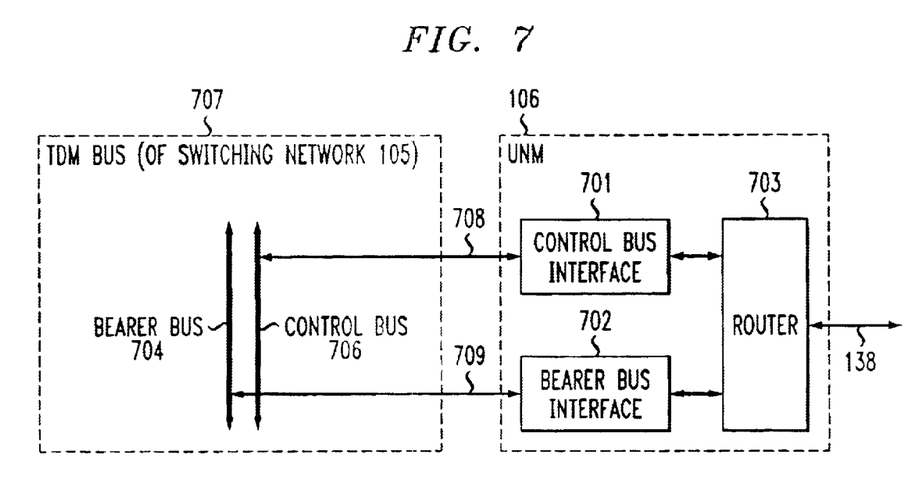
FIG. 7 illustrates, in block diagram form, an universal network module.

FIG. 7 shows in greater detail universal network module 106 of FIG. 1. Also illustrated in FIG. 7 is TDM bus 707 which is an integral part of switching network 105. The operations of TDM bus 707 in switching network 105 are well known to those skilled in the art. All units such as CO trunks 109 interface to switching network 105 via bearer bus 704 and control bus 706. Note, that telephone sets 107–108 have an intermediate line interface circuit to TDM bus 707. Control bus 706 communicates control information; whereas, bearer bus 704 communicates bearer information in a time division protocol. Bearer bus interface 702 communicates information from bearer bus 704 and router 703. Bearer bus interface 702 performs the necessary translations in protocols between bearer bus 704 and router 703. Similarly, control bus interface 701 communicates control information from control bus 706 and router 703. Note, that router 703 communicates designated control information to WAN 140 via link 138 and utilizes other control information to control its own internal operations and to transmit control information to computer 101 via control bus 706 and control bus interface 703. Control bus 701 communicates with control bus 706 via bilateral link 708. Bearer bus interface 702 communicates with bearer bus 704 via bilateral link 709.

Of course, various changes and modifications to the illustrative embodiment described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for redirecting telephone calls by a central switching system via a wide area network where the central switching system retains call control over the redirected telephone calls and the central switching system having a switching network and each of a plurality of remote switches having an individual switching network and each individual switching network having a plurality of connected telephone sets, comprising the steps of:

establishing by a first one of the plurality of remote switches one of a plurality of control channels for each of a first plurality of telephone sets connected to the first one of the plurality, of remote switches;

determining a call origination by the central switching system by a first one of the first plurality of telephone sets via a first one of the plurality of control channels for the establishment of a first one of the telephone calls to a second one of the first plurality of telephone sets;

establishing a first one of a plurality of bearer channels to the first one of the first plurality of telephone sets by the central switching system via the switching network of the central switching system and switching network of the first one of the plurality of remote switches;

transmitting an alert message to the second one of the first plurality of telephone sets by the central switching system via a second one of the plurality of control channels;

establishing a second one of plurality of bearer channels to the second one of the first plurality of telephone sets by the central switching system via the switching network of the central switching system and switching network of the first one of the plurality of remote switches;

communicating the first and second ones of the plurality of bearer channels by the switching network of the central switching system and the switching network of the first one of the plurality of remote switches;

transmitting a call answer message by the second one of the first plurality of telephone sets via the second one of the plurality of control channels to the central switching system;

determining by the central switching system in response to the call answer message that the first and second ones of the first plurality of telephone sets can directly communicate bearer information;

transmitting first and second path control messages to the first and second ones of the first plurality of telephone sets to directly communicate by the central switching system via the first and second ones of the plurality of control channels, respectively; and establishing a bearer connection between the first and second ones of the first plurality of telephone sets by the first one of the plurality of remote switches via the switching network of the first one of the plurality of remote switches in response to the first and second path control messages from the central switching system received via the first and second ones of the plurality of control channels.

2. The method of claim 1 further comprises the steps of transmitting third and fourth path control messages to the first and second ones of the first plurality of the telephone sets to remove the first and second ones of the plurality of bearer channels by central switching system; and removing the first and second ones of the plurality of bearer channels by the first one of plurality of remote switches in response to the third and fourth path control messages.

3. The method of claim 2 wherein each of the plurality of remote switches comprises a controller for communicating control messages with the central switching system and the step of establishing a bearer connection between the first and second ones of the first plurality of telephone sets comprises the steps of receiving the first and second control messages;

determining that both the first and second ones of the plurality of telephone sets are connected to the switching network of the first one of the plurality of remote switches; and controlling the switching network of the first one of the plurality of remote switches to establish the bearer connection between the first and second ones of first plurality of telephone sets.

4. The method of claim 1 further comprises the steps of determining another call origination by the central switching system by the first one of the first plurality of telephone sets via the first one of the plurality of control channels for the establishment of a second one of the telephone calls to a first one of a second plurality of telephone sets connected to a switching network of a second one of the plurality of remote switches;

establishing a third one of a plurality of bearer channels to the first one of the first plurality of telephone sets by the central switching system via the switching network of the central switching system and switching network of the first one of the plurality of remote switches;

transmitting another alert message to the first one of the second plurality of telephone sets by the central switching system via a third one of the plurality of control channels;.

establishing a fourth one of plurality of bearer channels to the first one of the second plurality of telephone sets by the central switching system via the switching network of the central switching system and switching network of the second one of the plurality of remote switches;

communicating the third one of the plurality of bearer channels by the switching network of the central switching system and the switching network of the first one of the plurality of remote switches and the fourth one of the plurality of bearer channels by the switching network of the central switching system and the switching network of the second one of the plurality of remote switches;

transmitting another call answer message by the first one of the second plurality of telephone sets via the third one of the plurality of control channels to the central switching system;

determining by the central switching system in response to the other call answer message that the first one of the first plurality of telephone sets and the first one of the second plurality of telephone sets can directly communicate bearer information;

transmitting a third path control message by the central switching system to the first one of the first plurality of telephone sets via the first one of the plurality of control channels and a fourth path control messages to the first one of the second plurality of telephone sets via the third one of the plurality of control channels to directly communicate; and establishing by the first one of the plurality of remote switches a bearer connection between the first one of the first plurality of telephone sets and the first one of the second plurality of telephone sets via the wide area network, the switching network of the first one of the plurality of remote switches and the switching network of the second one of the plurality of remote switches in response to the third path control message from the central switching system received via the first one of the plurality of control channels.

5. The method of claim 1 further comprises the steps of detecting multi-frequency dialing signals in the first one of the plurality of bearer channels by the controller in the first one of the plurality of remote switches;

decoding the multi-frequency dialing signals into dialed digits by the controller in the first one of the plurality of remote switches;

inserting the dialed digits into digit control messages by the controller in the first one of the plurality of remote switches; and transmitting the digit control messages to the central switching system by the controller in the first one of the plurality of remote switches.

6. The method of claim 5 wherein the step of determining a call origination comprises the steps of receiving the transmitted digit control messages; and identifying the second one of the first plurality of telephone sets as called telephone set.

7. An apparatus for redirecting telephone calls having a central switching system and a wide area network where the central switching system retains call control over the redirected telephone calls and the central switching system having a switching network and each of a plurality of remote switches having an individual switching network and each individual switching network having a plurality of connected telephone sets with each of the remote switches being interconnected with the central switching system via wide area network, comprising the steps of:

a first one of the plurality of remote switches establishing one of a plurality of control channels for each of a first plurality of telephone sets connected to the first one of the plurality of remote switches;

the central switching system determining a call origination by a first one of the first plurality of telephone sets via a first one of the plurality of control channels for the establishment of a first one of the telephone calls to a second one of the first plurality of telephone sets;

the central switching system further establishing a first one of a plurality of bearer channels to the first one of the first plurality of telephone sets via the switching network of the central switching system and switching network of the first one of the plurality of remote switches;

the central switching system further transmitting an alert message to the second one of the first plurality of telephone sets via a second one of the plurality of control channels;

the central switching system further establishing a second one of plurality of bearer channels to the second one of the first plurality of telephone sets via the switching network of the central switching system and switching network of the first one of the plurality of remote switches;

the switching network of the central switching system communicating the first and second ones of the plurality of bearer channels;

the second one of the first plurality of telephone sets transmitting a call answer message via the second one of the plurality of control channels to the central switching system;

the central switching system further determining in response to the call answer message that the first and second ones of the first plurality of telephone sets can directly communicate bearer information;

the central switching system further transmitting first and second path control messages to the first and second ones of the first plurality of telephone sets to directly communicate via the first and second ones of the plurality of control channels, respectively; and the first one of the plurality of remote switches further establishing a bearer connection between the first and second ones of the first plurality of telephone sets via the switching network of the first one of the plurality of remote switches in response to the first and second path control messages from the central switching system received via the first and second ones of the plurality of control channels.

8. The apparatus of claim 7 further comprises central switching system further transmitting third and fourth path control messages to the first and second ones of the first plurality of the telephone sets to remove the first and second ones of the plurality of bearer channels; and the first one of the plurality of remote switches further removing the first and second ones of the plurality of bearer channels in response to the third and fourth path control messages.

9. The apparatus of claim 8 wherein each of the plurality of remote switches comprises a controller for communicating control messages with the central switching system and for establishing a bearer connection between the first and second ones of the first plurality of telephone sets comprises the central switching system further receiving the first and second control messages;

the central switching system further determining that both the first and second ones of the plurality of telephone sets are connected to the switching network of the first one of the plurality of remote switches; and the controller of the first one of the plurality of remote switches further controlling the switching network of the first one of the plurality of remote switches to establish the bearer connection between the first and second ones of first plurality of telephone sets.

10. The apparatus of claim 7 further comprises the central switching system further determining another call origination by the first one of the first plurality of telephone sets via the first one of the plurality of control channels for the establishment of a second one of the telephone calls to a first one of a second plurality of telephone sets connected to a switching network of a second one of the plurality of remote switches;

the central switching system further establishing a third one of a plurality of bearer channels to the first one of the first plurality of telephone sets via the switching network of the central switching system and switching network of the first one of the plurality of remote switches;

the central switching system further transmitting another alert message to the first one of the second plurality of telephone sets via a third one of the plurality of control channels;

the central switching system further establishing a fourth one of plurality of bearer channels to the first one of the second plurality of telephone sets via the switching network of the central switching system and switching network of the second one of the plurality of remote switches;

the switching network of the central switching system further communicating the third one of the plurality of bearer;

the first one of the second plurality of telephone sets further transmitting another call answer message via the third one of the plurality of control channels to the central switching system;

the central switching system further determining in response to the other call answer message that the first one of the first plurality of telephone sets and the first one of the second plurality of telephone sets can directly communicate bearer information;

the central switching system further transmitting a third path control message to the first one of the first plurality of telephone sets via the first one of the plurality of control channels and a fourth path control messages to the first one of the second plurality of telephone sets via the third one of the plurality of control channels to directly communicate; and the first one of the plurality of remote switches further establishing a bearer connection between the first one of the first plurality of telephone sets and the first one of the second plurality of telephone sets via the wide area network, the switching network of the first one of the plurality of remote switches and the switching network of the second one of the plurality of remote switches in response to the third path control message from the central switching system received via the first one of the plurality of control channels.

11. The apparatus of claim 7 further comprises a digital signal processor in the controller in the first one of the plurality of remote switches for detecting multi-frequency dialing signals in the first one of the plurality of bearer channels;

the digital signal processor further decoding the multi-frequency dialing signals into dialed digits;

the controller in the first one of the plurality of remote switches further inserting the dialed digits into digit control messages; and the controller in the first one of the plurality of remote switches further transmitting the digit control messages to the central switching system.

12. The apparatus of claim 11 wherein the determination the call origination comprises the central switching system further receiving the transmitted digit control messages; and the central switching system further identifying the second one of the first plurality of telephone sets as a called telephone set.

* * * * *